United States Patent [19]

Brauer

[11] 4,154,796

[45] May 15, 1979

[54] RESPIRATOR

[75] Inventor: Lothar W. Brauer, Berlin, Fed. Rep. of Germany

[73] Assignee: Auergesellschaft GmbH, Berlin, Fed. Rep. of Germany

[21] Appl. No.: 803,858

[22] Filed: Jun. 6, 1977

[30] Foreign Application Priority Data

Jun. 4, 1976 [DE] Fed. Rep. of Germany ....... 2625896

[51] Int. Cl.[2] ......................... B01J 7/00; C01B 13/00; C09K 3/00

[52] U.S. Cl. ................................ 422/120; 128/191 R; 252/186; 252/188.3 R; 252/372; 422/164; 422/165

[58] Field of Search ......... 23/281; 128/191 R, 142 R, 128/142 G; 252/372, 188.3 R, 186; 423/351; 422/120, 122, 123, 164, 165, 166

[56] References Cited

U.S. PATENT DOCUMENTS

| | | | |
|---|---|---|---|
| 2,371,707 | 3/1945 | Rainier et al. | 423/351 X |
| 2,889,210 | 6/1959 | Bovard | 23/281 |
| 3,755,182 | 8/1973 | Marshall | 252/188.3 R |
| 3,767,367 | 10/1973 | Rio | 23/281 |
| 3,797,854 | 3/1974 | Poole et al. | 23/281 X |
| 3,920,803 | 11/1975 | Boryta | 23/281 X |
| 3,931,040 | 1/1976 | Breazeale | 252/188.3 R |

*Primary Examiner*—Joseph Scovronek
*Attorney, Agent, or Firm*—Brown, Flick & Peckham

[57] ABSTRACT

A chemical canister for use in a respirator has opposed openings, one for connection to a mouthpiece and the other for connection to the rest of the respirator. The canister contains a carbon dioxide removing and oxygen liberating chemical, and there also is a chemical which, upon being heated, will liberate nitrogen to mix with the oxygen liberated in the canister.

6 Claims, 1 Drawing Figure

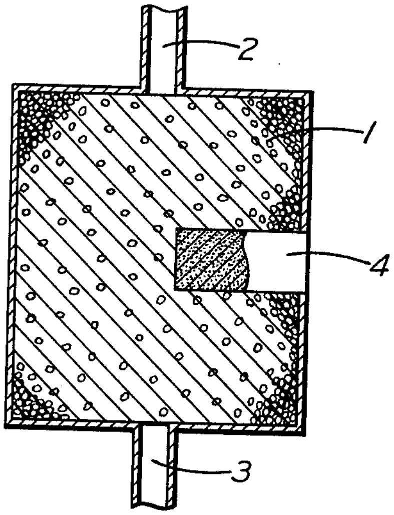
2
1
4
3

RESPIRATOR

It is known that the inhaling of pure oxygen when a man is doing heavy work, for example, or under conditions that deviate from normal atmospheric pressure, is physiologically detrimental to the person concerned. Premature symptoms of weariness may become evident or, for example, if the respirator is used for a long time, physiologically-conditioned breakdowns may occur in the user's metabolism.

It is among the objects of this invention to provide respirator oxygen supplying apparatus, with which the premature appearance of weariness and/or metabolic breakdowns are reduced as much as possible.

These objects are accomplished by the use of an additional unit; namely, a chemical body that liberates nitrogen into the inhaled gas. Nitrogen is of most interest because it is contained in the atmosphere and is simple and cheap to produce. Chemicals that are of interest in accordance with this invention are those which liberate nitrogen on being heated, such as ammonium nitrite or sodium azide. The reaction can be started electrically or thermally. It can be exothermic in nature, which will make it self-sustaining. It also can be kept in progress or controlled by continuous heating.

The invention is illustrated in the accompanying drawing, in which a chemical canister, shown in longitudinal section; for a respirator contains a chemical 1, such as $KO_2$, which, under the action of moisture in the exhaled breath, removes carbon dioxide and liberates oxygen. The canister is provided at one end with an opening 2 for connection to a breathing hose and mouthpiece, and at the other end with an opening 3 for connection to the rest of the respirator, such as to a rebreathing bag (not shown).

In accordance with this invention another chemical body or cartridge in the form of a candle 4 is provided for liberating nitrogen to mix with the oxygen liberated in the canister. Preferably, the candle is disposed inside the canister, with one end exposed at the side of the canister where it can be ignited in any suitable manner, such as in the manner that oxygen candles are ignited. The candle may contain ammonium nitrite or it may contain sodium azide and may be made like the one described in U.S. Pat. No. 3,755,182 entitled Nitrogen Generating Compositions. The nitrogen liberated by the candle mixes with the oxygen liberated in the canister, and this mixture of gases is inhaled. The nitrogen candle is designed to liberate nitrogen at such a rate that the inhaled gas will contain from 21% to 90% oxygen, but preferably from 30% to 70% oxygen. The balance of the gas is all or principally nitrogen. With the oxygen-nitrogen mixture composing the inhaled gas, the detrimental physiological conditions previously encountered no longer occur.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A chemical unit for use in a respirator, comprising a canister having opposed openings, one of said openings being adapted to be connected to a mouthpiece for inhalation and exhalation through the canister, a body of a carbon dioxide removing and oxygen liberating chemical in the canister between said openings, and a body of a nitrogen liberating chemical inside the canister for supplying nitrogen to the canister, said last-mentioned chemical liberating the nitrogen when ignited.

2. A chemical unit according to claim 1, in which the relative sizes of said chemical bodies are such that the gas inhaled from the canister will contain from 21% to 90% oxygen, with the rest of the gas consisting principally of nitrogen.

3. A chemical unit according to claim 2, in which the percentage of oxygen in said gas is between 30% and 70%.

4. A chemical unit according to claim 1, in which said chemical that liberates nitrogen is ammonium nitrite.

5. A chemical unit according to claim 1, in which said chemical that liberates nitrogen is sodium azide.

6. A chemical unit according to claim 1, in which said canister is provided between said opposed openings with an opening exposing a portion of said body of nitrogen liberating chemical for ignition.

* * * * *